2 Sheets—Sheet 1.

A. J. STEVENS.

POWER STEERING APPARATUS FOR VESSELS.

No. 9,990. Reissued Dec. 27, 1881.

Witnesses:
Jas. L. Boone
Wm. F. Clark

Inventor:
Andrew J. Stevens
by his attys., Boone & Osborn

N. PETERS, Photo-Lithographer, Washington, D. C.

A. J. STEVENS.

POWER STEERING APPARATUS FOR VESSELS.

No. 9,990 Reissued Dec. 27, 1881.

Witnesses:
Jno. L. Boone
Wm. F. Clark

Inventor:
Andrew J. Stevens
By his attys, Boone & Dalton

N. PETERS, Photo-Lithographer, Washington, D. C.

UNITED STATES PATENT OFFICE.

ANDREW J. STEVENS, OF SACRAMENTO, CALIFORNIA.

POWER STEERING APPARATUS FOR VESSELS.

SPECIFICATION forming part of Reissued Letters Patent No. 9,990, dated December 27, 1881.

Original No. 230,079, dated July 13, 1880. Application for reissue filed July 2, 1881.

*To all whom it may concern:*

Be it known that I, ANDREW J. STEVENS, of the city and county of Sacramento, in the State of California, have made and invented a new and useful Improvement in Power Steering Apparatus for Vessels; and I do hereby declare that the following is a full, clear, and exact description of the same, reference being had to the accompanying drawings by figures and letters.

My invention relates to an improved means for operating the tiller of a vessel from the reciprocations of a piston-rod of short stroke, and to a means for holding the tiller in any position of adjustment when the motor is at rest or not in action.

It consists in giving to a differential drum or barrel a movement of rotation as well as a motion or travel in a right line from the movements of a piston in its cylinder, by which the ropes or chains from the tiller of a vessel, being attached to a drum or barrel, are wound and unwound thereon and therefrom as the piston is moved, and the tiller is thereby caused to travel in the required direction with an increased movement over the length of stroke of the piston.

It consists, also, in applying to the steering-gear a yielding friction lock or brake for holding the tiller, which is adapted to be thrown off when the tiller is to be moved and to be applied again to lock the tiller when the moving power is taken off, whereby the tiller is held and locked in position in a manner that permits it to yield when any excessive strain comes against the rudder.

Figure 1:
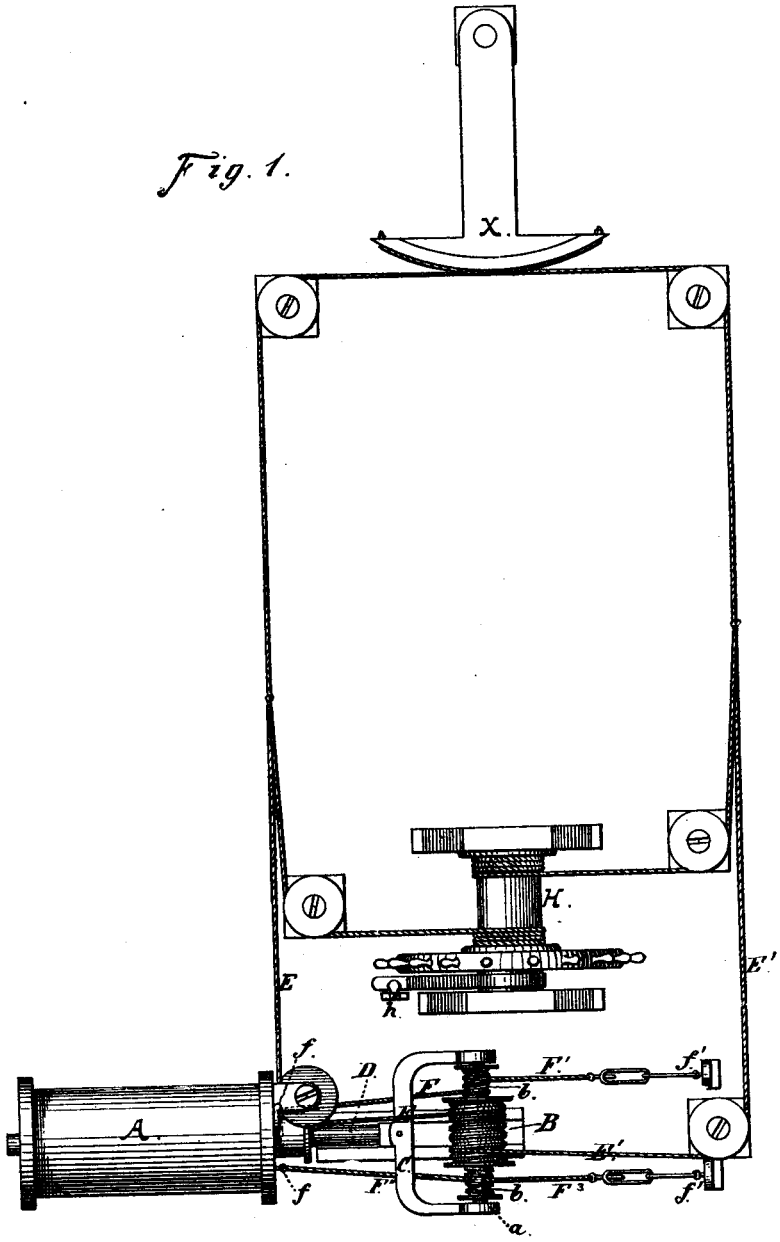
Figure 2:
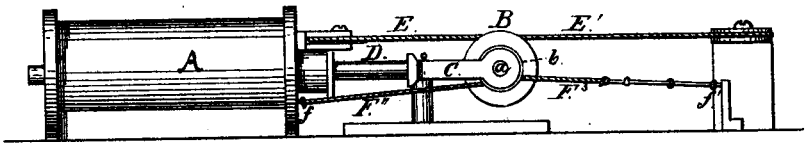
Figure 3:
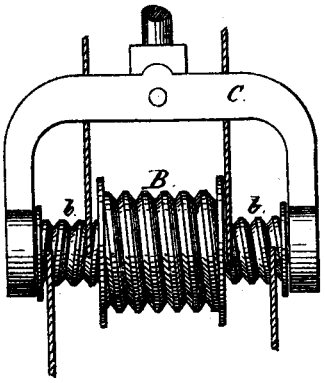
Figure 4:
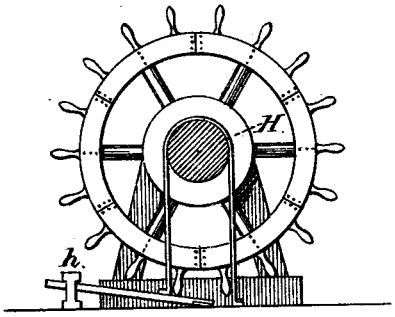

Referring to the accompanying drawings, Figure 1 is a general plan view of my improved apparatus. Fig. 2 is a front elevation of the motor-cylinder, multiplying-drum, and tiller-ropes of the apparatus. Fig. 3 is a detail view of the differential drum; and Fig. 4 is a cross-section through the hand steering-drum, showing the brake.

The motor-cylinder A has a piston-rod of short stroke, and is provided with proper valve-operating mechanism. It is located in convenient proximity to the wheel-house, wherein the valve mechanism can be manipulated and controlled by the steersman after the usual manner of arranging steering apparatus of this class. The movements of the piston are multiplied and transmitted to the tiller by the action of a differential drum or barrel, B, to which a movement of rotation, as well as a travel back and forth in a straight line uniformly with its rotation, is imparted from the piston. This drum is made with a larger and a smaller circumference or barrel, (shown at B and *b*, respectively, in the drawings,) and its axis *a* is held and rotates in bearings formed on the arms of a yoke or head, C, on the end of the piston-rod D. In the present instance the smaller barrel, *b*, is shown as disposed upon both sides of the larger barrel, B, so that the latter is on the center part of the axis, midway between the arms of the yoke. The smaller barrel is acted directly upon by the piston-rod to communicate a rotating movement to the larger barrel, and this larger barrel, B, acts upon the tiller-ropes E E′ and works the tiller. The proportions of these two circumferences to each other will, of course, determine the increase in the movements given to the tiller over the motion of the piston-rod.

I produce the rotating movements of the drum by means of two sets of cords or ropes, F F′ F″ F³, one set for each barrel *b*, and by the reciprocations of the piston-rod; but one set of ropes and its barrel is a duplication of the other one, and each acts in the same manner upon the main barrel. If the barrel *b* is placed only at one side of the larger barrel, B, but one set of operating-cords will be required. One rope, F, of the set has one end secured to an eyebolt, *f*, on the cylinder-head or the bed-plate or other fixed point, and after being laid around the drum *b* the required number of turns it is fastened at its other end to the drum. The other rope, F′, runs from the opposite side, where, after being secured to a fixed point, *f′*, it is laid around the drum *b* in a direction opposite to that of the first rope. Thus, while the piston-rod in its reciprocation carries the drum B *b* back and forth toward and away from these fixed points *f f′*, these two ropes act to produce a rotation of the drum by being alternately wound and unwound.

Upon the circumference of the drum B, that is employed to multiply the rotating movements to the tiller-rope, I fix and lay these ropes E E′ running from the tiller X. The ends of these ropes are fastened to the drum, and one is laid in opposite direction to the other in the usual manner, so that the drum, in rotating, shall wind up one as it pays off or unwinds from the other rope. By this arrangement the movement of the piston-rod gives rotation to the main drum B through the medium of the smaller drum, and as the drum B *b* moves in a right line to the piston during the revolution it acts upon the tiller-ropes in an increased ratio, drawing upon and winding up one tiller-rope as it unwinds from and releases the other. By the employment of a differential drum having these two movements of travel in a right line and rotation on its axis I produce an increased movement of the tiller, and I am enabled thereby to use a short cylinder and piston-rod and to dispense with complex mechanism for transmitting and multiplying motion in machines or apparatus of this character.

In connection with this means of operating the tiller-ropes of a vessel, I employ a hand steering mechanism auxiliary thereto to allow the rudder to be managed by hand when circumstances require it; but all power steering machinery is usually provided with a hand steering device of some kind, to serve in case of accident to the main apparatus; and the employment of such is not original with me.

It will be noticed that in the application of my improved mechanism some means or device must be applied and combined either directly to the piston-rod or to the tiller-ropes or their drum, for the purpose of preventing any loose play of the tiller, and to hold the rudder at rest at any point of adjustment. A brake device of some kind is therefore required that can be brought into play to hold the tiller when the motor-piston is not in motion, and that shall be thrown out of action when the tiller is to be moved by its power apparatus. The brake I use consists of a friction strap or band, which is brought down and held against a friction-surface on a drum or cylinder by means of a foot-lever so placed that it can be conveniently operated by the steersman while he manipulates the valve-operating mechanism to work the power-piston. In this case I have applied the friction-brake directly to the hand steering-drum H, and have provided the brake-lever with a holding-down catch, *h*. Thus when this lever is forced down the brake is applied upon the drum H, and no movement of either of the tiller-ropes can take place until the lever is released, excepting on extraordinary occasions, when from heavy seas and rough weather the rudder is subjected to unusual lateral strain and pressure. At such times the friction-brake will hold the tiller at rest up to a certain point of pressure, but will slip and allow a partial revolution of the drum and a movement of the tiller when the strain becomes too great.

Having thus fully described my invention, what I claim, and desire to secure by Letters Patent, is—

1. In a power steering apparatus for vessels, the combination, with the tiller, of a motor-piston, a differential drum, and intermediate mechanism connecting the drum to the piston and to the tiller, whereby the drum is adapted to have a rotary motion and to travel back and forth in a right line with relation to the piston and operate the tiller, as set forth.

2. A combined hand and power steering apparatus having a motor-piston, a differential drum and intermediate mechanism connecting the drum to the piston and the tiller, and a drum or axle, H, controlled by a friction lock or brake, and connected either directly with the tiller or with the intermediate mechanism between the piston-drum aforesaid and the tiller, constructed and arranged for intermittent or joint operation substantially as set forth.

3. In combination with the piston-rod of a motor-cylinder, the drum B, moved or caused to travel in a right line by said piston-rod, and having a movement of rotation given to it during its travel by the action of cords or ropes upon the barrel *b*, said ropes being passed around the barrel approximately at right angles to its axis and attached to fixed points in front and rear thereof, as herein set forth.

4. In combination with the piston-rod of a motor-cylinder, the yoke or head, the differential drum B *b*, moving with the piston-rod and rotated by the combined action of said piston-rods and cords passing about the portion *b*, and the ropes E E′, wound about the principal drum B and connected with the tiller X, whereby the rotation of the drum operates the tiller, substantially as set forth.

Witness my hand and seal.

ANDREW J. STEVENS. [L. S.]

Witnesses:
P. J. HOPPER,
C. TRAVER.